UNITED STATES PATENT OFFICE.

SAMUEL RINGGOLD, OF FLORIDA, AND EDWARD EARLE, OF SAVANNAH, GEORGIA.

IMPROVED MODE OF PRESERVING TIMBER BY BOILING THE SAME IN LIME-WATER.

Specification forming part of Letters Patent No. 877, dated August 6, 1838.

*To all whom it may concern:*

Be it known that we, SAMUEL RINGGOLD, of Florida, and EDWARD EARLE, of the city of Savannah, in the county of Chatham and State of Georgia, have invented a new and useful Improvement on the Mode of Preserving Timber; and we do declare that the following is a full and exact description.

The nature of our invention consists in applying heat by boiling in strong lime-water to the interior as well as the exterior of timber, according as the size and kind of timber and the use in which it is to be employed may admit or require, for the destruction and prevention of worm in it, and for the correction or removal of the corruptible sap and the occupation of its place by a preservative substance.

To enable others skilled in the art to make use of our invention, we will proceed to describe it and its application.

We first bore the timber, if it be of a size to admit of it, through the center, making the perforation of a caliber proportioned to the size of the piece—say from half an inch to one and a half or two inches. Then we boil it in strong lime-water for a length of time proportioned to its size, as four to six hours if it be twelve inches square, and so in proportion to its substance. When the timber has thus had the heat and fluid conveyed through its whole substance it is to be removed to a shed, where, protected from the sun and wind, it may gradually dry. Finally, before it is used the perforation through the center is to be completely filled with mild dry lime or with petroleum or coal-tar, as the purpose for which it is intended may make preferable, and plugged by wood of the same kind and prepared in the same manner; also, if the use to which the timber is destined be such as to admit of it, the exterior may be payed or coated with hot petroleum or coal-tar.

What we claim as our invention, and desire to secure by Letters Patent, is—

The boiling of timber in lime-water, as above set forth. We apply this fluid to the interior as well as the exterior of timber by means of the central perforation, when the size of the timber requires it, as the most effectual mode of preserving it from the ravages of insects and from rot.

We do not claim the saturating of timber by a solution of lime in water when applied cold, or when heated by that heat which is generated by the slaking of the lime, but confine our claim to the boiling it in lime-water during one, two, three, or more hours.

SAMUEL RINGGOLD. [L. S.]
EDW. EARLE. [L. S.]

Witnesses:
WILLIAM WARFIELD,
SAMUEL MERRYMAN.